United States Patent
Shibuya et al.

(10) Patent No.: US 6,618,694 B1
(45) Date of Patent: Sep. 9, 2003

(54) METHOD, APPARATUS AND COMPUTER PROGRAM PRODUCT FOR FORMING DATA TO BE ANALYZED BY FINITE ELEMENT METHOD AND CALCULATION METHOD BASED ON FINITE ELEMENT METHOD

(75) Inventors: Akinobu Shibuya; Kouji Matsui, both of Tokyo; Hidehito Matsuyama, Kanagawa, all of (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/084,108

(22) Filed: May 26, 1998

(30) Foreign Application Priority Data

May 27, 1997 (JP) .............................................. 9-152932

(51) Int. Cl.$^7$ ........................... G06F 17/50; G06F 7/60; G06F 17/10

(52) U.S. Cl. ............................................... 703/1; 703/2

(58) Field of Search ......................................... 703/1, 2

(56) References Cited

U.S. PATENT DOCUMENTS

| | | | | |
|---|---|---|---|---|
| 5,014,230 A | * | 5/1991 | Sinha et al. ............ | 395/500.23 |
| 5,255,352 A | * | 10/1993 | Falk ........................... | 345/427 |
| 5,315,537 A | * | 5/1994 | Blacker ....................... | 716/20 |
| 5,768,156 A | * | 6/1998 | Tautges et al. ............... | 716/20 |

FOREIGN PATENT DOCUMENTS

| | | |
|---|---|---|
| EP | 0 704 811 A2 | 3/1996 |
| JP | 3-29057 | 2/1991 |
| JP | 4-168337 | 6/1992 |
| JP | 5-108694 | 4/1993 |
| JP | 6-4630 | 1/1994 |
| JP | 8-63619 | 3/1996 |

OTHER PUBLICATIONS

Rizzo, A.R., "FEA Isn't Just for Analysis Anymore", Machine Design, vol. 64, No. 21–22, Oct. 22, 1992, pp. 177–182.
Kugutsu, Naoyuki, et al., "Maruchiguriddo Giho no Kukan Kairo Moho e no Tekiyo", Transactions of the Institute of Electronics, Information and Communication Engineers, vol. J73 C–I, No. 7 Jul. 1990, pp. 493–500.
Anthony R. Rizzo, FEA Isn't Just for Analysts Anymore, Oct. 22, 1992, vol. 64, No. 21, pages.
Naoya Kukutsu et al, Application of Multigrid Technique to the Spatial Network Method.
Patent Abstracts of Japan, vol 17, No. 467, Aug. 25, 1993, Japanese Patent 05 108694 A, Apr. 30.
Patent Abstracts of Japan, vol. 18, No. 200, Apr. 7, 1994, Japanese Patent 06 004630 A, Jan. 14, 1994.

* cited by examiner

Primary Examiner—Kevin J. Teska
Assistant Examiner—Hugh Jones
(74) Attorney, Agent, or Firm—Foley & Lardner

(57) ABSTRACT

A user uses part data forming means 101 and module data forming means 102 to input the actual dimension, physical constants and mesh dividing number for fundamental shapes which are registered in advance, thereby forming parts, and then indicates the relative position between the parts to form the entire shape of an assembly of plural parts without paying attention to coincidence or non-coincidence of nodal points. Data converting means 104 divides the shape of each part thus assembled according to the indicated mesh divisional number to generate element data and nodal point data. Further, it generates a constraint equation for connecting nodal points which are non-connected between neighboring parts, and forms an analysis model 401. A finite element method analyzer 105 uses approximate calculation means 106 to approximate a non-connected nodal point displacement from a nodal point displacement of neighboring structural elements on the basis of the constraint equation.

3 Claims, 17 Drawing Sheets

FIG.11

| TYPE OF FIGURE | INPUT ITEM |
|---|---|
| RECTANGULAR PARALLELOPIPED (FIG. 4) | DIMENSION OF A, B, C<br>PHYSICAL CONSTANTS OF MATERIAL<br>DIVISIONAL NUMBER OF A, B, C |
| TRIANGULAR PRISM (FIG. 5) | DIMENSION OF A, B, H<br>ANGLE OF $\alpha$<br>PHYSICAL CONSTANTS<br>DIVISIONAL NUMBER OF A, B, H |
| CYLINDER (FIG. 6) | DIMENSION OF R, H<br>PHYSICAL CONSTANTS OF MATERIAL<br>DIVISIONAL NUMBER OF CIRCUMFERENCE, R, H |
| SPHERE (FIG. 7) | DIMENSION OF R<br>PHYSICAL CONSTANTS OF MATERIAL<br>DIVISIONAL NUMBER OF CIRCUMFERENCE, R |
| TRAPEZOIDAL HEXAHEDRON (FIG. 8) | DIMENSION OF A, B, C, D<br>PHYSICAL CONSTANTS OF MATERIAL<br>DIVISIONAL NUMBER OF A, B, D |
| NOTCHED PILLAR (FIG. 9) | DIMENSION OF A, B, C, r<br>PHYSICAL CONSTANTS OF MATERIAL<br>DIVISIONAL NUMBER OF NOTCHED ARC, d, C |
| SQUARE CYLINDER (FIG. 10) | DIMENSION OF A, B, C, D, E, F, G<br>PHYSICAL CONSTANTS OF MATERIAL<br>DIVISIONAL NUMBER OF A, B, C, D, E, F, G |

F I G.12

| TYPE OF FIGURE | NUMBER OF STRUCTURAL DEFINING INPUT (INVENTION) | | NUMBER OF STRUCTURAL DEFINING INPUT (PRIOR ART) |
|---|---|---|---|
| RECTANGULAR PARALLELOPIPED (FIG. 4) | DIMENSION | 3 | COORDINATE 8 |
| | DIVISIONAL NUMBER | 3 | |
| TRIANGULAR PRISM (FIG. 5) | DIMENSION | 3 | COORDINATE 7 |
| | DEGREE | 1 | |
| | DIVISIONAL NUMBER | 3 | |
| CYLINDER (FIG. 6) | DIMENSION | 2 | COORDINATE 72 |
| | DIVISIONAL NUMBER | 3 | |
| SPHERE (FIG. 7) | DIMENSION | 1 | COORDINATE 1226 |
| | DIVISIONAL NUMBER | 2 | |
| TRAPEZOIDAL HEXAHEDRON (FIG. 8) | DIMENSION | 4 | COORDINATE 8 |
| | DIVISIONAL NUMBER | 3 | |
| NOTCHED PILLAR (FIG. 9) | DIMENSION | 4 | COORDINATE 24 |
| | DIVISIONAL NUMBER | 3 | |
| SQUARE CYLINDER (FIG. 10) | DIMENSION | 7 | COORDINATE 16 |
| | DIVISIONAL NUMBER | 7 | |

FIG.14

| ASSEMBLY CONTENT | |
|---|---|
| ASSEMBLY ITEM | VALUE |
| MEMBER NAME OF ASSEMBLY TARGET | T3.PAT |
| PART NAME OF ORIGIN OF MEMBER | T3.PAT |
| ORIGIN NUMBER | 5" |
| ROTATIONAL ANGLE (DEGREE) AROUND X-AXIS OF ORIGIN | 0 |
| ROTATIONAL ANGLE (DEGREE) AROUND Y-AXIS OF ORIGIN | 0 |
| ROTATIONAL ANGLE (DEGREE) AROUND Z-AXIS OF ORIGIN | 0 |
| PART NAME OF BASE POINT FOR ASSEMBLY | T1.PAT |
| BASE POINT NUMBER | 1 |
| RELATIVE DISTANCE IN X-AXIS DIRECTION FROM BASE POINT | 15 |
| RELATIVE DISTANCE IN Y-AXIS DIRECTION FROM BASE POINT | 13 |
| RELATIVE DISTANCE IN Z-AXIS DIRECTION FROM BASE POINT | 0 |

| TYPE OF MODEL | TOTAL ELEMENT NUMBER | MINIMUM VALUE OF MAXIMUM MAIN STRESS | MAXIMUM VALUE OF MAXIMUM MAIN STRESS |
|---|---|---|---|
| NODE-CONTINUOUS MODEL | 2948 | $-19.1 \text{kgf/mm}^2$ | $108 \text{kgf/mm}^2$ |
| NODE-DISCONTINUOUS MODEL | 3416 | $-22.1 \text{kgf/mm}^2$ | $118 \text{kgf/mm}^2$ |

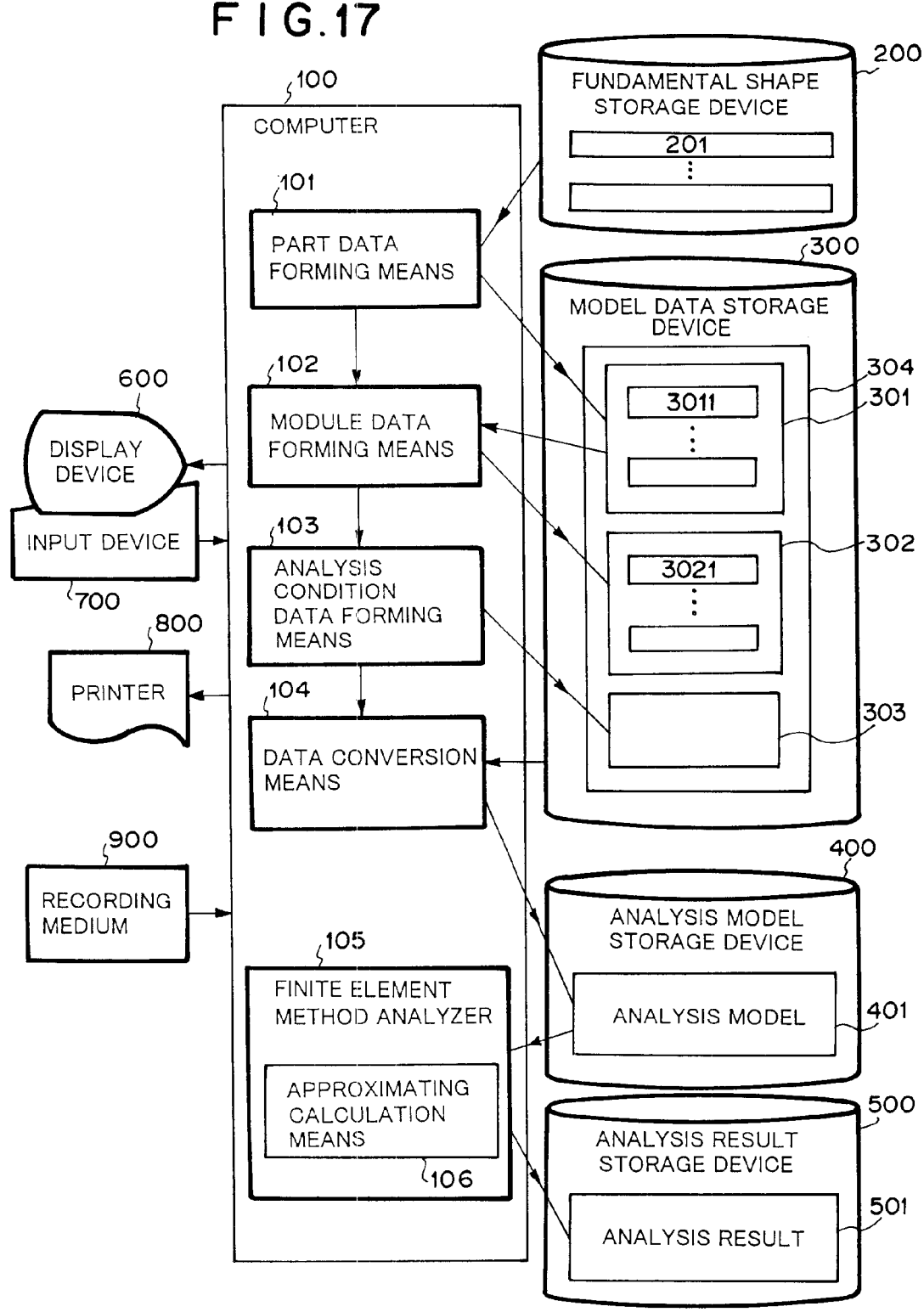

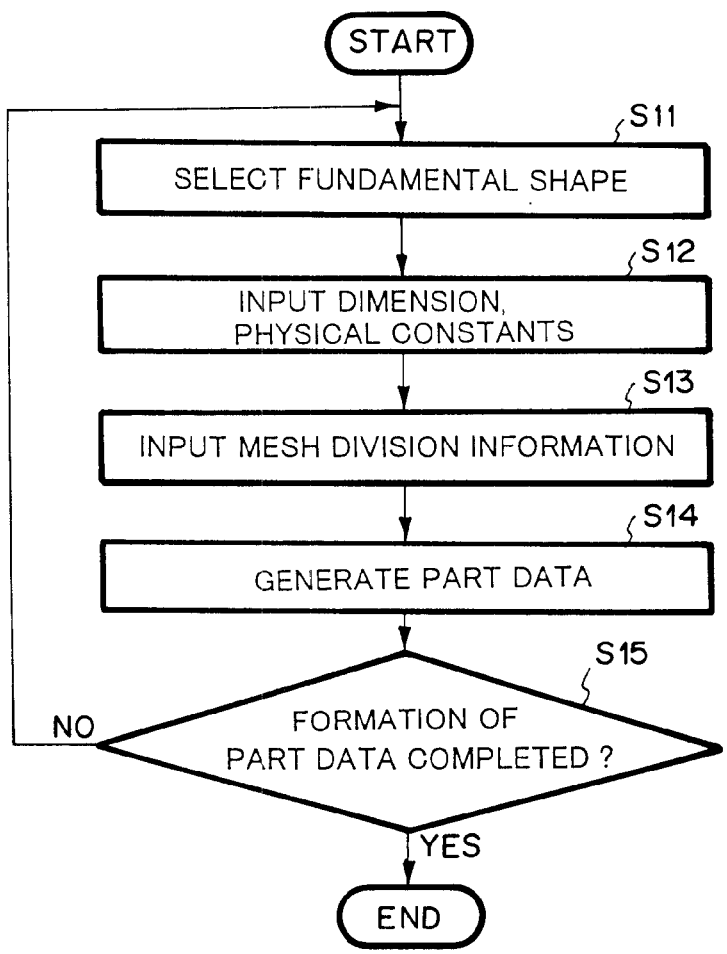

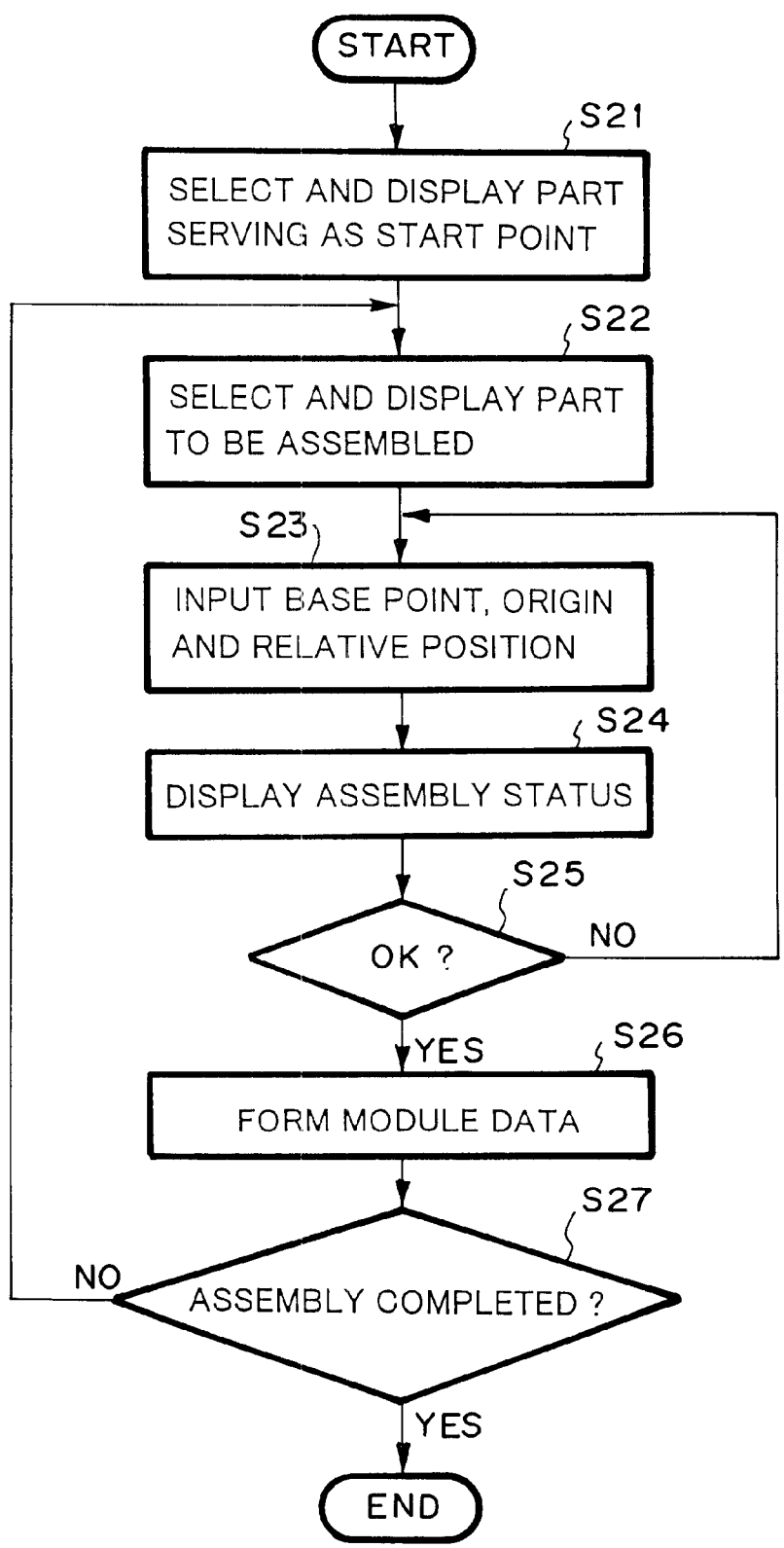

FIG. 21

| MODULE NAME | |
|---|---|
| PART NAME TO BE ASSEMBLED | |
| APEX SERVING AS ORIGIN | ROTATIONAL ANGLE |
| NAME OF PART SERVING AS BASE POINT FOR ASSEMBLY | |
| APEX SERVING AS ORIGIN | RELATIVE DISTANCE |

FIG. 22

| |
|---|
| TEMPERATURE LOAD CONDITION |
| CONSTRAINT CONDITION |
| LOAD CONDITION |

F I G . 24
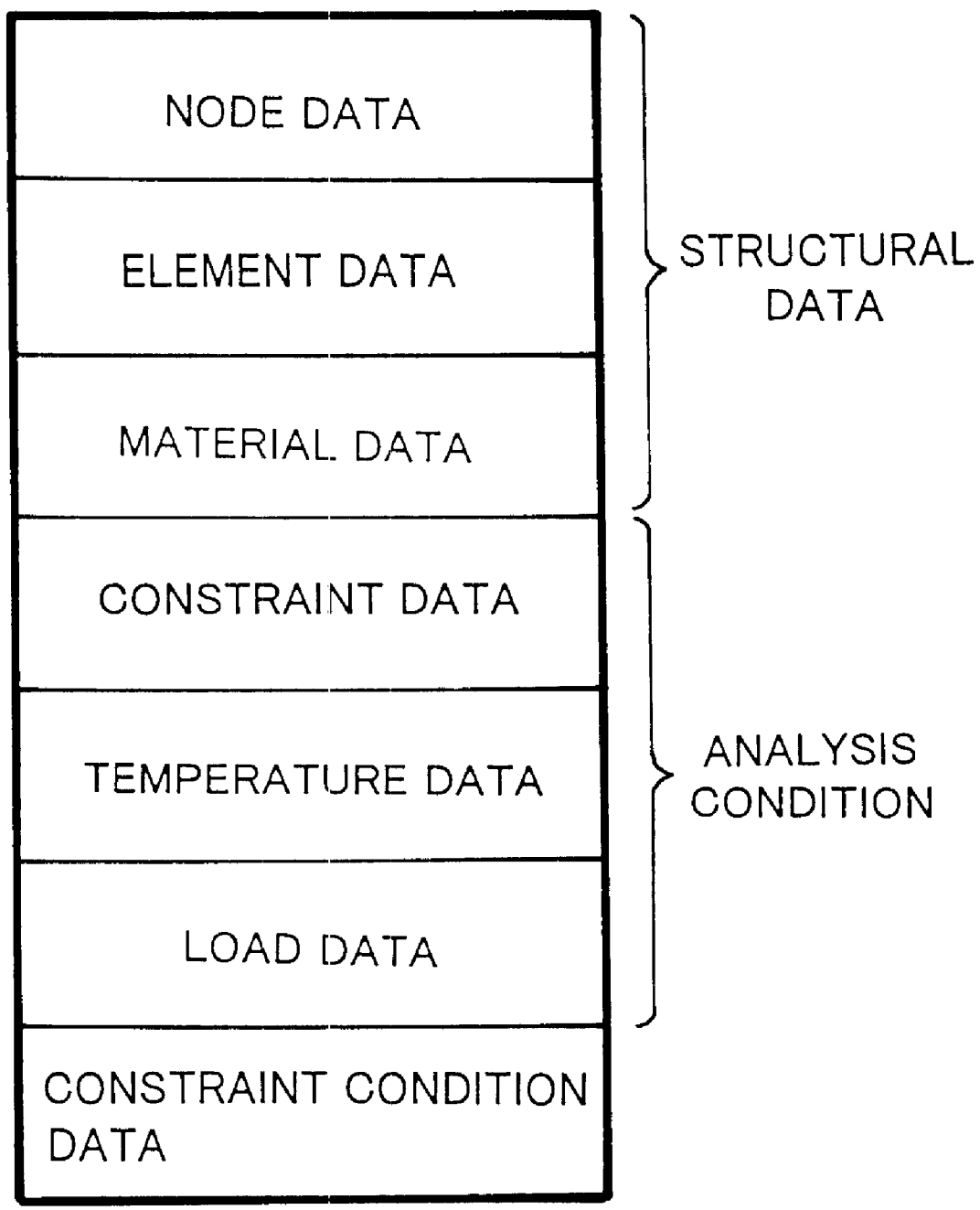

METHOD, APPARATUS AND COMPUTER PROGRAM PRODUCT FOR FORMING DATA TO BE ANALYZED BY FINITE ELEMENT METHOD AND CALCULATION METHOD BASED ON FINITE ELEMENT METHOD

BACKGROUND OF THE INVENTION

1. Field of the Invention

The present invention relates to method, apparatus, and computer program product for forming data to be analyzed by finite element method (FEM) by which displacement, temperature, and the like are analyzed and a calculation method based on finite element method.

2. Description of the Prior Art

According to the finite element method, the shape of an object which is an analysis target is divided into small units, a solution is sectionally approximated by a function having a finite value for every unit to calculate the solution of the entire shape. Hereinafter, the division of the entire shape into small units is referred to as "mesh division", each unit thus obtained to as "element", and an apex of an element to as "nodal point". The shape to be analyzed is defined by an assembly of element data and nodal point data, and these data are referred to as "structural data".

In order to the form structural data, it is necessary to form the overall shape to be analyzed. A method of inputting the coordinates of all the apexes of the shape has been hitherto widely used to form the overall shape. However, this method has the disadvantage that it needs more time as an analysis target becomes three-dimensional and more complicated.

Therefore, JPA-6-4630 disclosed a method of combining fundamental shapes and local shapes which are registered in advance, thereby forming the overall shape. According to this method, the basic shapes and the local shapes are selected to input the actual dimensions, and the respective shapes of the basic shapes and local shapes are combined with one another, whereby the overall shape can be readily formed.

In order to form the structure data, a mesh dividing work is further needed. There have been hitherto known various techniques for supporting the mesh dividing work. For example, according to the method disclosed in JPA-6-4630, the overall shape of the assembled elements is automatically divided into hexahedral regions, such divisional numbers in the longitudinal, lateral and height directions that are equal between neighboring hexahedral regions are received from a user for every hexahedral regions, and the mesh division is performed on the basis of the divisional numbers. Further, according to the method disclosed in JPA-3-29057, the mesh division is automatically performed by a three-dimensional solid mesh generator, and each nodal point is moved by using a three-dimensional isoparametric smoothing method so that the shape of each element is well regulated. Still further, according to the method disclosed in JPA-5-108694, a similar shape model which is similar to a shape model to be analyzed and formed as an assembly of square blocks is generated, and it is projected onto the shape model (analysis target) to perform the mesh division. Any technique as explained above is based on the idea that the nodal points of the respective elements constituting the analysis target shape are coincident between neighboring elements.

As described above, it has been a dominant idea in the conventional techniques that the nodal points must be coincident between the neighboring elements. Therefore, when some fundamental shapes are combined to form the overall shape as disclosed in JPA6-4630, much time is needed for the mesh dividing work thereof. This is because a user must indicate the mesh divisional number so that the nodal points are coincident between neighboring areas.

SUMMARY OF THE INVENTION

Therefore, an object of the present invention is to provide a method for forming data to be analyzed by a finite element method, which can perform the work of forming the shape to be analyzed and of mesh division in short time.

Another object of the present invention is to provide a method for executing calculation based on a finite element method which can obtain a solution even when the nodal points are not coincident between elements.

According to one aspect of the present invention, there is provided a method for forming structural data to be analyzed by a finite element method which comprises steps of: providing structural elements having various shapes; inputting dimension for each of the structural elements; applying mesh generation to each of the structural elements, and piling up the structural elements irrespective of coincidence or non-coincidence of nodal points.

According to another aspect of the present invention, there is provided a calculation method based on finite element method for calculating nodal point displacement or nodal point temperature in case that structural data to be analyzed by a finite element method contain non-connected nodal points, which comprises a step of calculating the displacements or temperatures of non-connected nodal points of a structural element by using the displacements or temperatures of nodal points of the neighboring structural elements on the basis of constraint equations.

According to still another aspect of the present invention, there is provided an apparatus for generating input data to be analyzed by a finite element method, which comprises: a storage device which stores fundamental shapes; part data forming means for setting the actual dimension, the physical constants and the mesh dividing number for the fundamental shapes in accordance with a user's instruction, thereby forming part data for the fundamental shapes; module data forming means for forming the data of a module on the basis of a pair of parts indicated by the user and the relative position between the parts in the pair, the module being constructed by a combination of the paired parts; analysis condition data forming means for forming analysis condition data according to the analysis condition indicated by the user; and data converting means for inputting model data comprising the part data, the module data and the analysis condition data, and forming an analysis model comprising structural data, converted analysis condition data and constraint equations, wherein the structural data comprises elements data and nodal points data which are obtained by building up the parts in accordance with the relative positions and then dividing the shapes of the parts by the mesh division number, each components of the converted analysis condition data corresponds to each nodal points, and the constraint equations connect non-connected nodal points between the parts.

BRIEF DESCRIPTION OF THE DRAWINGS

FIG. 11 is a table showing input items which are needed to define a figure;

FIG. 12 is a table showing a comparison example of the number of numerical values to be input when a structural element is defined, and the number of numerical values which is needed to define a figure on the basis of a conventional coordinate input method;

FIG. 14 is a table showing an example of a input display frame when a silicon rectangular parallelopiped structural element is assembled with an aluminum rectangular parallelopiped structural element set as a base;

FIG. 17 is a block diagram showing an embodiment of a data forming apparatus for a finite element method according to the present invention;

FIG. 18 is a flowchart showing an example of the processing of a part data forming means;

FIG. 19 is a diagram showing part data;

FIG. 20 is a flowchart showing an example of the processing of a module data forming means;

FIG. 21 is a diagram showing module data;

FIG. 22 is a diagram showing analysis condition data;

FIG. 24 is a diagram showing an analysis model;

DETAILED DESCRIPTION OF THE PREFERRED EMBODIMENTS

Embodiment

Preferred embodiments of a data forming method and a calculation method for a finite element method according to the present invention will be explained hereunder with reference to the accompanying drawings.

Figure 1:
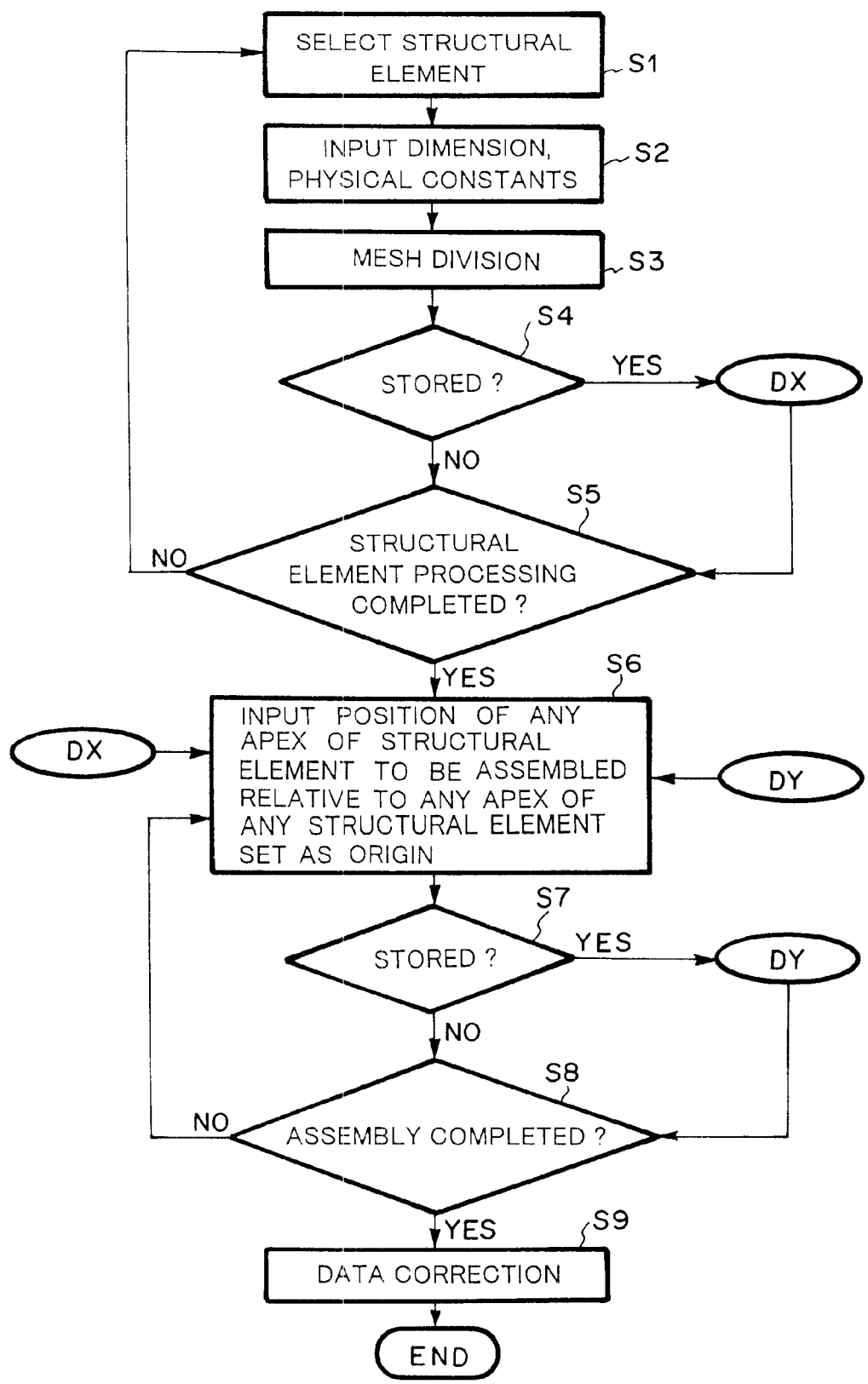
FIG. 1 is a flowchart showing an example of the process flow of a data forming method for a finite element method according to the present invention.

FIG. 1 is a flowchart showing the process flow of a data forming method for a finite element method according to the present invention. This process is performed on a computer system which includes a computer such as a work station or the like, a storage device such as a magnetic disk or the like, an input device such as a keyboard, a mouse or the like and a display device such as a CRT display or the like. Some structural elements having simple shapes are registered in the storage device, and users form structural data using these structural elements.

First, a user inputs dimension data and data of physical constants for all the structural elements which are usable for a final target shape (S1, S2), and then performs a mesh dividing work before assembling these structural elements (S3). Each of the structure elements divided into meshes can be stored as structural element DX in the unit of structure element (S4). The order of the input of the dimension data and the physical constants and the mesh dividing work is not limited to the above order. In this embodiment, since the mesh division is carried out on a structural element having a simple shape, automatic mesh generation used in a conventional finite element method is not necessary and the mesh division of each structural element is performed by inputting a division number for the sides of the structural element or the like. For example, in the case of a rectangular parallelopiped, a divisional number is input for both sides in longitudinal and lateral directions of a base and for a side in the height direction to perform the mesh division. In the case of a cylinder, a divisional number is input for each of the circumferential, radial and height directions to form the mesh division.

When the input of the dimensions and the physical constants for necessary structural elements and the mesh division are completed (YES: S5), these structural elements are assembled to construct structural data. First, a structural element serving as a base is selected, and the relative position relative distance of any apex of a next structural element with respect to any apex of the base structural element set as an origin and the rotating angle of the next structural element are input to pile up structural elements (S6). The pile-up result can be separately stored as assembled structural data DY (S7). The structural elements are piled up as explained above to thereby construct structural data to be analyzed (analysis target). At this time, it is sufficient to select any apex of any piled-up structural element as the origin and then input any apex coordinate of a structural element to be piled up with respect to the origin. Therefore, it is unnecessary to take coincidence or non-coincidence of nodal points between the structural elements into consideration. Further, in this structural data forming method, not only the structural element data DX stored are usable, but also the structural data DY which have been assembled are usable like the structural element data DX.

After the structure data to be analyzed has been constructed (YES: S8), the data are corrected if necessary (S9). In the data correction, not only the pile-up position is changed, but also the dimension, the physical constants and the mesh division may be changed for every structural elements.

Figure 2:
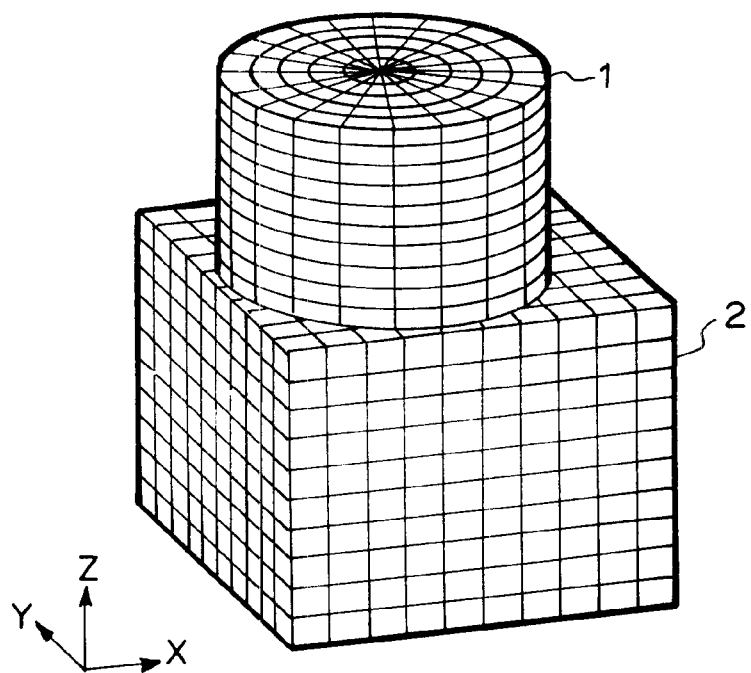
FIG. 2 is a diagram showing an example of structural data obtained by piling up a cylindrical (columnar) structural element on a rectangular parallelopiped structural element.

FIG. 2 is a diagram showing an example of structural data when cylindrical structural element 1 is piled up on rectangular parallelopiped structural element 2 in the process as explained above. As shown in FIG. 2, the nodal points of the elements on the upper surface of rectangular parallelopiped structural element 2 are not coincident with the nodal points of the elements on the lower surface of cylindrical structural element 1.

Next, a method of calculating nodal point displacement or nodal point temperature when the structural data contain non-connected nodal points will be explained.

Figure 3:
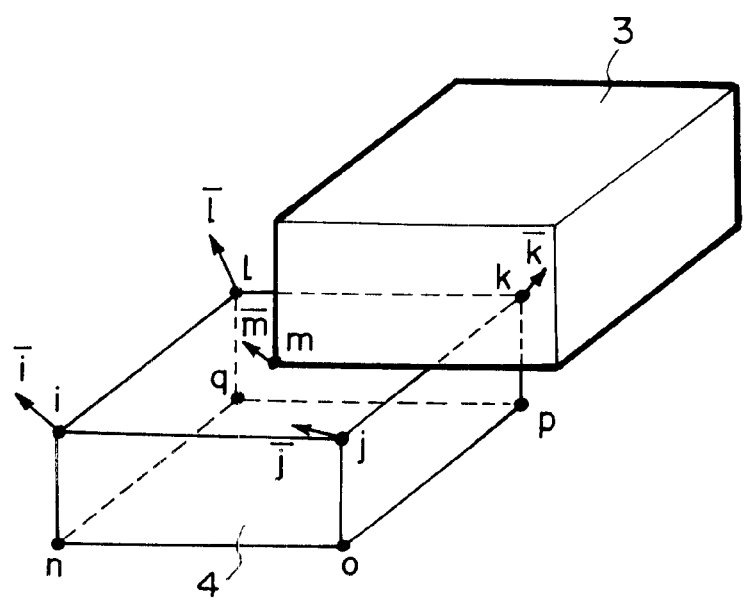
FIG. 3 is a diagram showing an example of a connection status of a nodal point non-coincidence element of a structural element connection portion.
Figure 4:
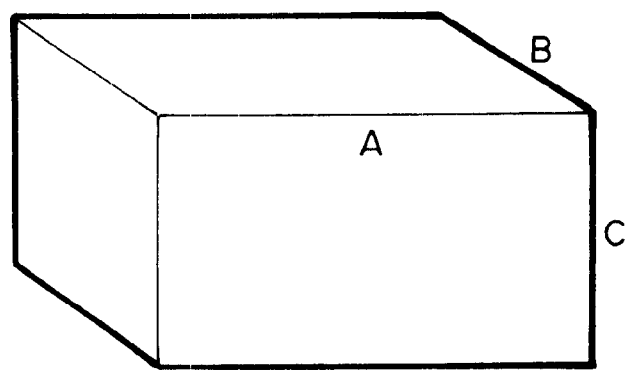
FIG. 4 is a diagram showing a rectangular parallelopiped structural element.
Figure 5:
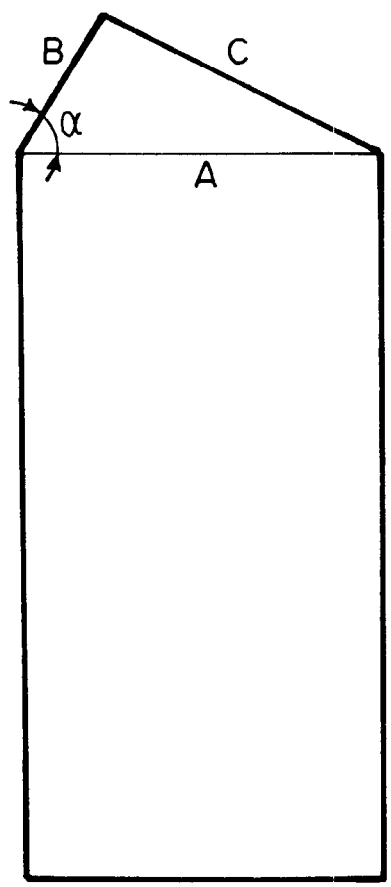
FIG. 5 is a diagram showing a triangular prism structural element.
Figure 6:
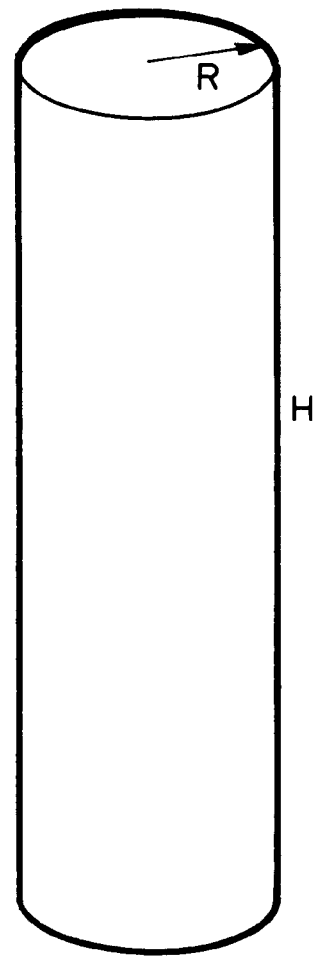
FIG. 6 is a diagram showing a cylindrical structural element.
Figure 7:
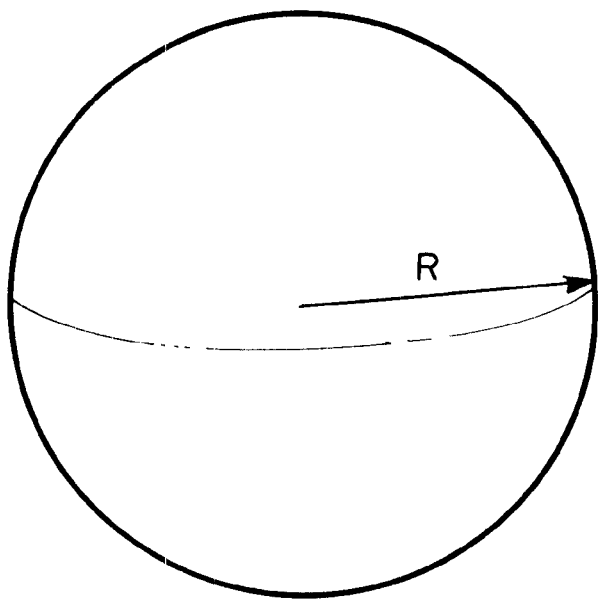
FIG. 7 is a spherical structural element.
Figure 8:
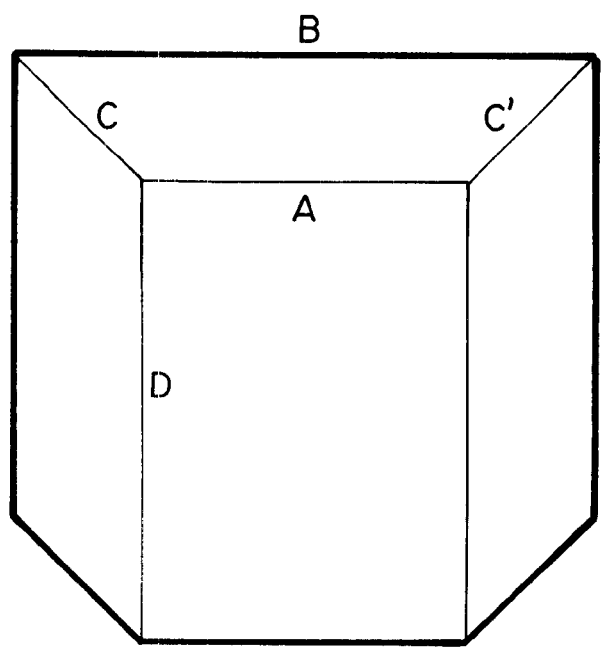
FIG. 8 is a diagram showing a trapezoidal hexahedral structure element.
Figure 9:
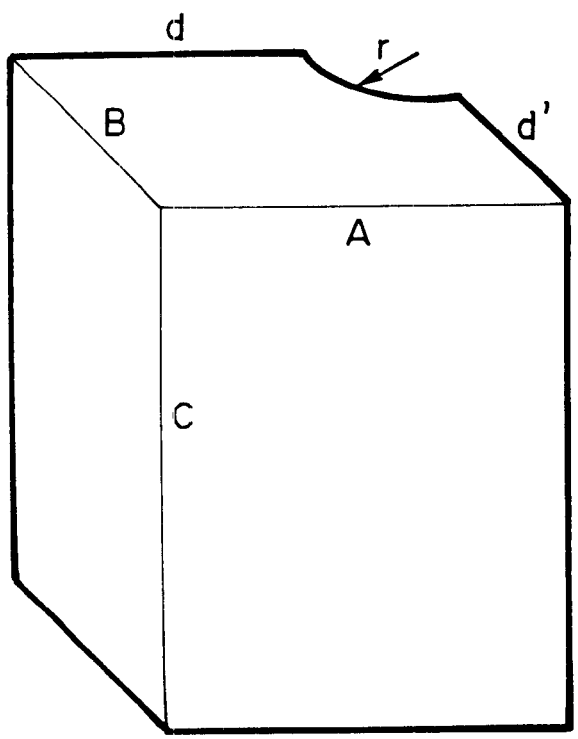
FIG. 9 is a diagram showing a notched pillar structural element.
Figure 10:
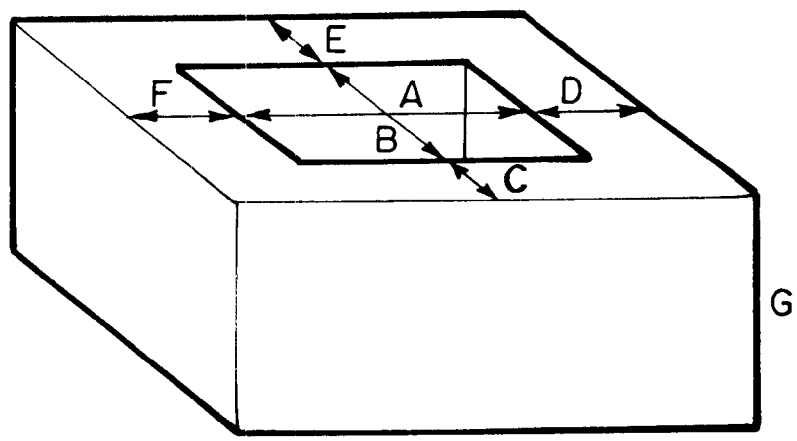
FIG. 10 is a square cylindrical structure element.

FIG. 3 shows a connection status of nodal point non-coincidence elements at a structural element connection portion. In FIG. 3, reference numeral 4 represents an element of a structural element, and it is designed in a rectangular parallelopiped shape and has nodal points i, j, k, l, n, o, p, q. Reference numeral 3 represents an element of another structural element which is piled up on element 4, and m represents a nodal point located on the upper surface of element 4. FIG. 3 shows an example of the connection status that the rectangular parallelopiped elements are connected to each other, and no limitation is imposed upon the shape and dimension of the elements.

A displacement vector at the non-connected nodal point m of element 3 in FIG. 3 is approximately calculated by the following constraint equation which uses the displacements of the four nodal points i, j, k, l on the same plane of element 4 and interpolative coefficients:

$$\vec{m} = [\text{interpolative function}] \begin{Bmatrix} \vec{i} \\ \vec{j} \\ \vec{k} \\ \vec{l} \end{Bmatrix}. \quad (1)$$

In equation (1), the displacement of non-connected nodal point m is interpolatively calculated from the displacements of the nodal points at the four points on the same plane of neighboring element 4, and no restriction is imposed upon the number and position of nodal points for use. For example, the displacement of non-connected nodal point m may be interpolatively calculated using the displacements of all the nodal points i, j, k, l, n, o, p, q of neighboring element 4 in FIG. 3.

When the structural data contain non-connected nodal points, the displacements of all the non-connected nodal points are approximately calculated by the constraint equation using the interpolative function. Further, when another structural element is piled up on the structural element comprising an assembly of this kind of elements, the same calculation as explained above is successively performed to thereby obtain all the resolutions.

In the thermal conduction analysis using nodal point temperature in place of the nodal point displacement, by using the temperature values $T_i$, $T_j$, $T_k$, $T_l$, of nodal points i, j, k, l of element 4 in place of the displacement vectors of element 4 of equation (1), temperature $T_m$ of the non-connected nodal point m of element 3 can be also interpolatively calculated in the same manner as explained above. In the interpolative calculation of the non-connected nodal point temperature, no restriction is imposed upon the number and position of nodal points for use.

No restriction is imposed upon the interpolative function for use, however, an excellent approximate value can be obtained when an isoparametric shape function is used.

EXAMPLE

Next, an example of the data forming method and the calculation method for the finite element method according to the present invention will be explained in detail.

No restriction is imposed upon the type and number of the structural elements which are registered in advance. However, in this example, it is assumed that seven structural elements shown in FIGS. 4 to 10 are registered in advance and an application analysis tool is formed for evaluation.

FIG. 11 tabulates input items needed to define figures shown in FIGS. 4 to 10.

In the case of a triangular prism (FIG. 5), a trapezoidal hexahedron (FIG. 8), a notched pillar (FIG. 9), the divisional input number is set to as small a value as possible in order to simplify the divisional work. That is, for the triangular prism, (divisional number of side C)=(divisional number of side B), for the trapezoidal hexahedron, (divisional number of side B)=(divisional number of side A) and (divisional number of side C')=(divisional number of side C), and for notched pillar, (divisional number of side A)+(divisional number of side B)=(divisional number of notched arc) and (divisional number of side d')=(divisional number of side d)

FIG. 12 tabulates a comparison result of the number of numerical values to be input in order to define these structural elements between this example and the conventional coordinate inputting method. However, in the conventional method, when the mesh divisional number is required to be partially input, the input number moreover increases by the number required to define the mesh divisional number. It is assumed that for a cylindrical shape, (number of apexes)=(divisional number of circumference)×2, and for a spherical shape, (number of apexes)=(divisional number of circumference)×(divisional number of circumference−2)+2, and (divisional number of circumference)=36 in FIG. 12. In the conventional method, it takes much time to calculate the coordinates of a structural element. On the other hand, in this example, the input of figures' data can be performed in short time because the dimensions of the figures are directly input. Further, in the conventional method, as the structure is more complicated, it is more difficult to determine the coordinates. On the other hand, in this example, the structural element is defined by only the dimension thereof, and the position thereof is defined by setting the coordinate of any one apex thereof with respect to an origin which is set to any apex of any other structural element. Therefore, even if the structure is complicated, the input is still simple.

Figure 13:
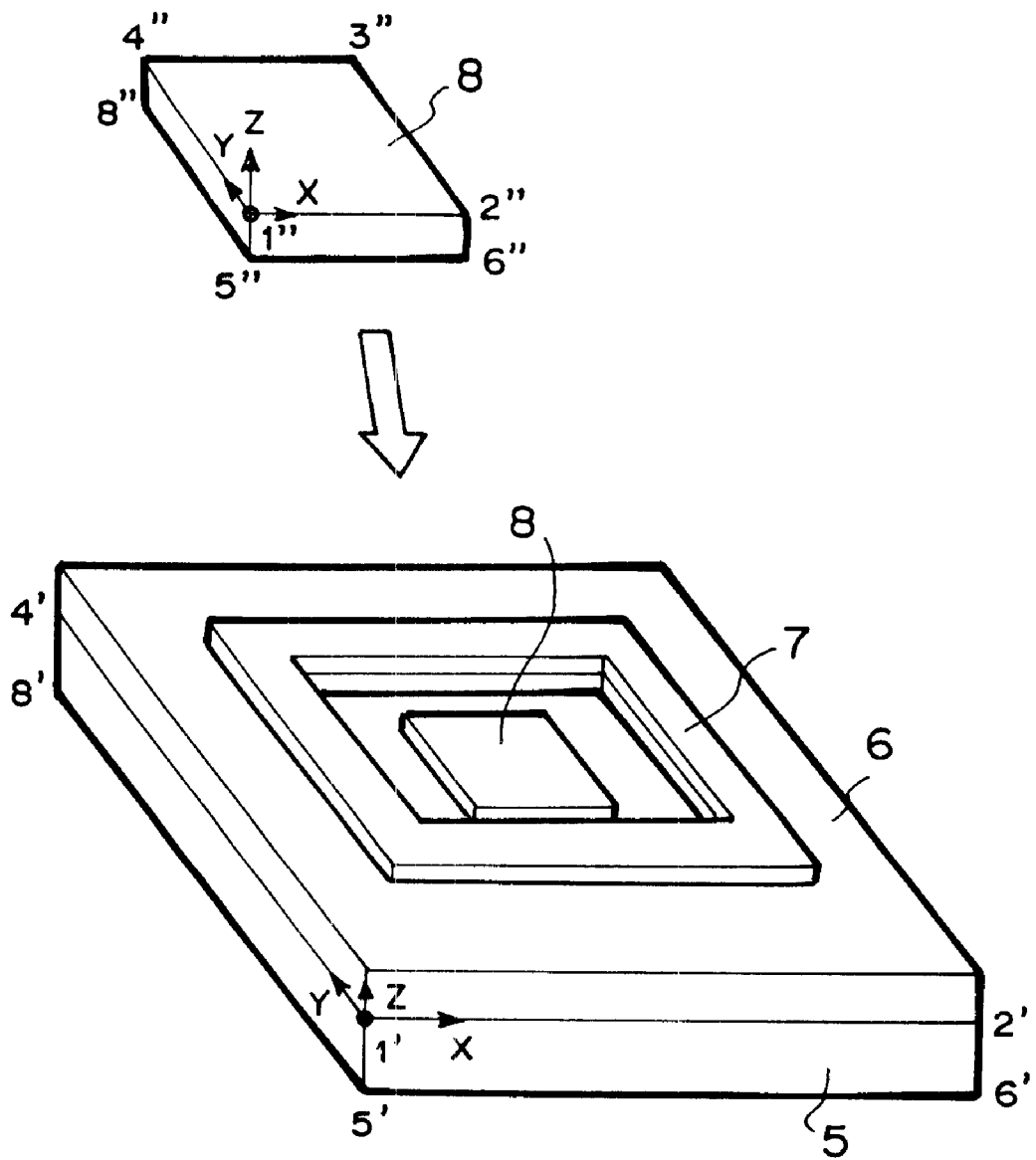
FIG. 13 is a diagram showing a structural element assembly example.

FIG. 13 shows an example of an assembly of structure elements. Aluminum square cylindrical structure element 6 and silicon rectangular structural element 8 are disposed on aluminum rectangular parallelopiped structural element 5 set as a base, and then copper square cylindrical structural element 7 is disposed on aluminum square structural element 6. In this case, each of all the structural elements other than silicon rectangular parallelopiped structural element 8 has an apex which is coincident with that of the structural element serving as the base, and thus the calculation of the relative position thereof is unnecessary because when a new structural element is added, any apex of any already built up structural element can be set as base point. For silicon rectangular parallelopiped structural element 8, it is sufficient only to take the coordinate of one point (apex 5" in the figure) into consideration. In addition, the origin serving as the base is set to an apex (apex 1' in the figure) on the upper surface of aluminum rectangular parallelopiped structural element 5, and the relative distances of apex 5" with respect to apex 1' along x-direction and y-direction are merely input. Therefore, the input time can be greatly shortened as compared with the conventional method in which all the apex coordinates of the structural body to be analyzed are input.

FIG. 14 shows an example of an input display frame when silicon rectangular parallelopiped structural element 8 is disposed on aluminum rectangular parallelopiped structural element 5 set as a base. T3. PAT represents an identifier for silicon rectangular parallelopiped structural element 8. In this case, silicon rectangular parallelopiped structural element 8 alone is disposed on aluminum rectangular parallelopiped structural element 5, and thus both of "member name of assembly target" and "part name of origin of member" are set to T3. PAT.

However, when an assembly of plural structural elements which have been assembled is piled up on another structural element, an identifier for the assembly is displayed in "member part of assembly target", and an identifier for a structural element which is in the assembly and serving as a base of these elements is displayed in "part name of origin of members". T1.PAT represents an identifier for aluminum rectangular parallelopiped structural element 5, and displayed in "part name of starting point of assembly". In FIG. 14, the relative distance (15, 13, 0) is input while apex 5" of the bottom surface of silicon rectangular parallelopiped structural element 8 is set to "origin number" and apex 1' on the upper surface of aluminum rectangular parallelopiped structural element 5 is set as the starting point. The rotational angle is set to zero. Since an initial value is equal to zero, it is practically sufficient to input the relative distance between the starting point and the origin along only X-axis and Y-axis.

Figures 15, 16:
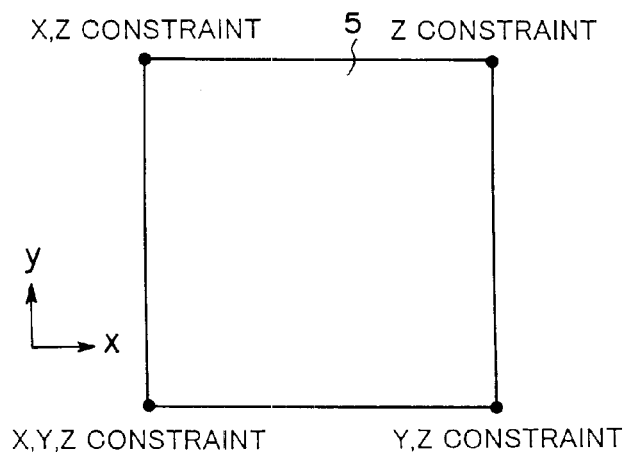
FIG. 15 is a diagram showing a constraint condition set.
FIG. 16 is a table showing a comparison example of the minimum value and the maximum value of the maximum main stress of models when nodal points are continuous and when nodal points are discontinuous.

The thermal stress when the assembled structural body is varied in temperature from 25° C. to 760° C. is calculated by the finite element method. As shown in FIG. 15, the constraint condition is set so that one apex of the bottom surface of aluminum rectangular parallelopiped structural element 5 is constrained in the x-, y-, and z- axis directions, the diagonal apex is constrained in the z-axis direction, and one of the residual apexes is constrained in the x-, and z- axis directions while the other is constrained in the y-, and z- axis directions. A constraint equation based on an isoparametric function is used for the interpolative calculation of the non-connected nodal point displacement. In a preproduction tool, the meshing work is performed before assembly, however, a nodal-point-coincidence model is also prepared for a calculation precision test for nodal-point-non-coincidence. FIG. 16 shows the minimum value and the maximum value of the maximum main stress for nodal-points-continuous model and nodal-point-discontinuous model. The difference of the maximum main stress between the nodal-point-continuous model and the nodal-point-discontinuous model is within a tolerable range from the viewpoint of simply comparing the difference in the structure and material. If a model in which the divisional number is set at a large value is formed, the distance between nodal points is reduced, and also the precision of the isoparametric interpolation is improved, so that the difference between the nodal-point-continuous mode and the nodal-point-discontinuous model is further reduced.

Embodiment

Next, an embodiment of a data forming apparatus for the finite element method according to the present invention will be explained in detail.

Referring to FIG. 17, the data forming apparatus for the finite element method according to this embodiment includes computer 100, fundamental shape storage device 200, model data storage device 400, analysis result storage device 500, display device 600, input device 700, printer 800 and recording medium 900. Recording medium 900 is a computer readable recording medium such as a CD-ROM, a magnetic disk, a semiconductor memory or the like. Programs recorded in recording medium 900 are read out by computer 100 to control the operation of computer 100 and cause computer 100 to operate as part data forming means 101, module data forming means 102, analysis condition data forming means 103 and data conversion means 104. Further, these programs also cause computer 100 to operate as finite element method analyzer 105.

Some fundamental shape data 201 are registered in fundamental shape storage device 200 such as a magnetic disk or the like in advance. Each of fundamental shape data 201 represents a rectangular parallelopiped, a triangular prism, a cylindrical (column), a trapezoidal hexahedron, a notched pillar, a square cylinder or the like as shown in FIGS. 4 through 10.

According to an indication by a user, part data forming means 101 appends the actual dimension, the physical constants (for example, Young's modulus, Poisson's ratio, coefficient of linear expansion, and the like) and the mesh divisional number to fundamental shapes registered in fundamental shape storage device 200, thereby forming part data corresponding to the fundamental shapes. The processing of part data forming means 101 is shown in FIG. 18. When there is a selection input of a fundamental shape from input device 700, part data forming means 101 reads out the corresponding fundamental shape data 201 from fundamental shape storage device 200 to display an image of the fundamental shape on a screen of display device 600 (S11). Subsequently, part data forming means 101 receives the input of the dimension and the physical constants corresponding to the fundamental shape from input device 700 (S12), and further, the input of mesh division information as to how the fundamental shape is mesh-divided (S13). The items of indicating the dimension and the divisional number for each fundamental shape may be the same as shown in FIG. 11. Part data forming means 101 makes part data obtained, for example, by collecting the part name, the selected fundamental shape and the received dimension, physical constants and mesh divisional number in a predetermined format, and stores these part data as one part data 3011 in model data storage device 300 (S14). The above operation is repeated for every fundamental shapes which are selected by the user (S15) Accordingly, part data group 301 which consists of required number of part data 3011 is generated in model data storage device 300.

Next, module data forming means 102 forms a data of module which consist of combination of pairs of parts according to a user's input in which the user selects the pairs and inputs relative distance between the parts in each of the pairs. FIG. 20 is a flowchart showing the operation of module data forming means 102.

When there is a selection input of a part serving as a starting point for the assembly from input device 700, module data forming means 102 reads out the corresponding part data from part data group 301, and displays an image of the shape of the part on the screen of display device 600 (S21). Subsequently, module data forming means 102 receives a selection input of a part to be assembled from input device 700, and reads out the corresponding part data from part data group 301 to display an image of the shape of the part on the screen of display device 600 (S22). Subsequently, module data forming means 102 displays the screen as shown in FIG. 14, receives a part having the apex serving as a base point, the apex, an apex serving as an origin of a part to be assembled, the rotational angle of the latter part, the relative distance between both the apexes, and the like from input device 700 (S23), and displays an image of an assembly status on the screen of display device 600 as shown in FIG. 13 (S24). If there is input of acceptance from input device 700 (YES: S25), module data forming means 102 generates module data by grouping in a predetermined format a module name, the name of a part to be assembled, the apex serving as the origin, rotational angle of the part, the name of a part serving as a base point for the assembly, and the relative distance between the apex serving as the base point and the origin, and stores the module data as one module data 3012 in model data storage device 300 (S26). If there is cancel input (not input of acceptance) (NO: S25), the processing returns to step S23 to receive the relative distance, and the like again.

The above operation is repeated for every assembly parts selected by the user (S27), whereby an image of the final shape is displayed on display device 600, and a module data group 302 which consists of the required number of module data 3021 is formed.

Next, analysis condition data forming means 103 forms analysis condition data 303 according to an analysis condition which is indicated by the user, and stores the analysis condition data 303 into model data storage device 300. FIG. 22 shows an example of the analysis condition data 303. A temperature load condition contains an initial temperature and a reference temperature. A constraint contains a part name to be constrained and information on a point constraint, a line constraint and a surface constraint. For example, when a surface is constrained, a surface number, a constraint direction, and the like are set. A load condition contains a part name to be constrained and information on a point load, a line load and a surface load. For example, when a load is applied to a point, the load condition contains a point number and load values for x-, y-, and z- directions. Further, when a load is applied to a surface, the load condition contains a surface number and load values for x-, y- and z- directions.

Figure 23:
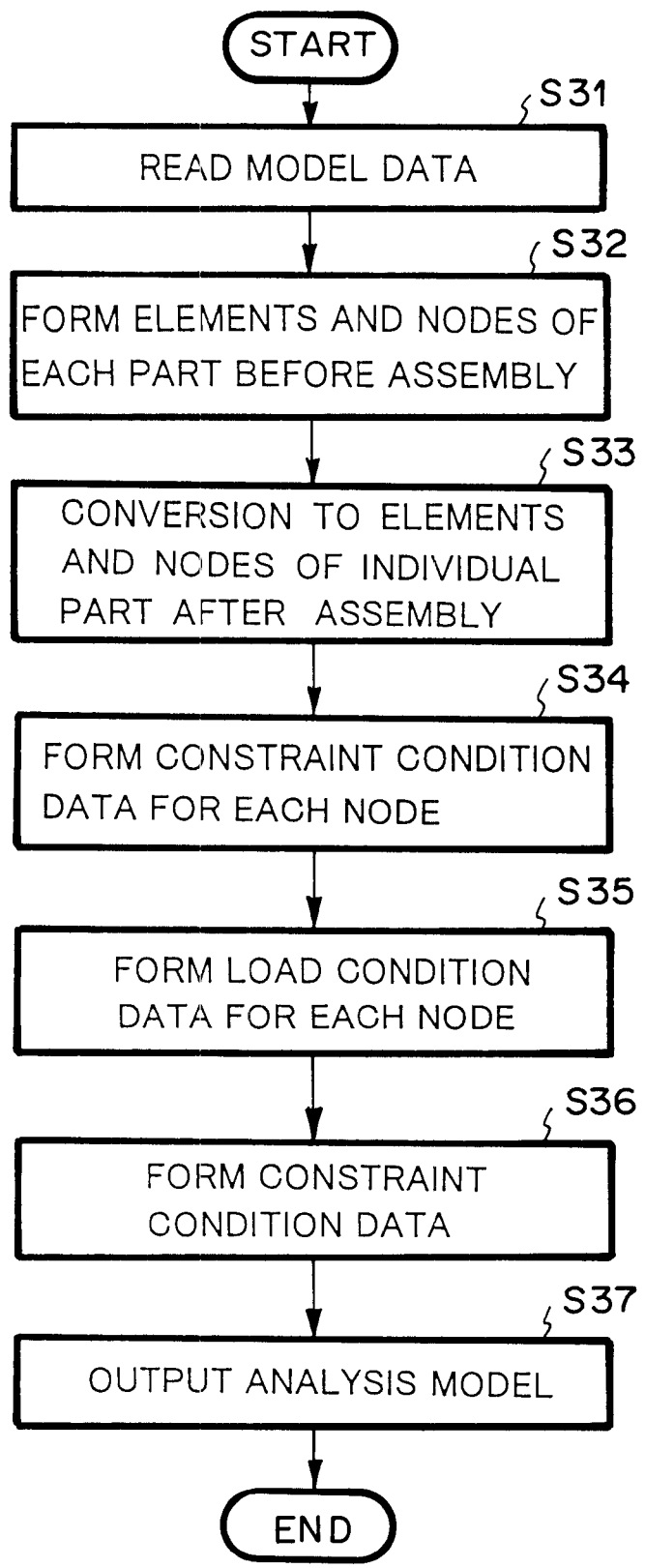
FIG. 23 is a flowchart showing an example of the processing of a data conversion means.

When model data 304 comprising part data group 301, module data group 302 and analysis condition data 303 are completed in model data storage device 300 as explained above, data conversion means 104 converts model data 304 to analysis model 401 for finite element method analyzer 105. FIG. 23 shows an example of the processing thereof.

First, data conversion means 104 read out model data 304 from model data storage device 300 (S31). Subsequently, data conversion means 104 divides the fundamental shape having the dimension by the mesh divisional number for every individual part data 3011 to create meshes, and generates the data consisting of the elements and nodal points of the part (S32). The positions of each nodal point, and the like are given in a coordinate system containing a prescribed apex of the part as its origin. Subsequently, data conversion means 104 converts the data of the elements and nodal points of all the parts to data in one coordinate system on the basis of the relative position between the parts indicated by module data group 302 (S33). Subsequently, data conversion means 104 converts the constraint condition in analysis condition data 303 to constraint condition data for every nodal points (S34), and also the load condition in analysis condition data 303 to load condition for every nodal points (S35). Subsequently, data conversion means 104 generates constraint condition data for connecting nodal points which are non-connected between neighboring parts (S36). Thereafter, data conversion means 104 outputs analysis model 401 comprising nodal point data, element data, material data, constraint data, temperature data, load data and constraint condition data as shown in FIG. 24 to analysis model storage device 400 (S37).

The generation of the constraint condition data at the step S36 will be explained in more detail.

The constraint equation on the displacement of a structure is represented by the following equation (2):

$$U_i = \sum_{j=1}^{r_i} \alpha_{qj} U_{qj} \quad (2)$$

$U_i$; dependent nodal point displacement
$U_{qj}$; independent nodal point displacement
$r_i$; number of independent nodal points
$\alpha_{qj}$; coefficient of independent nodal point displacements The following equation (3) is used to apply the above equation (2) to a connecting condition of nodal points between isoparametric three-dimensional 8 nodal point elements:

$$Xi = \sum_{j=1}^{8} NqjXqj$$

$$Yi = \sum_{j=1}^{8} NqjYqj$$

$$Zi = \sum_{j=1}^{8} NqjZqj$$

$Nq1=(1+\xi)(1+\eta)(1+\zeta)/8$ $Nq2=(1-\xi)(1+\eta)(1+\zeta)/8$ $Nq3=(1-\xi)(1-\eta)(1+\zeta)/8$ $Nq4=(1+\xi)(1-\eta)(1+\zeta)/8$ $Nq5=(1+\xi)(1+\eta)(1-\zeta)/8$ $Nq6=(1-\xi)(1+\eta)(1-\zeta)/8$ $Nq7=(1-\xi)(1-\eta)(1-\zeta)/8$ $Nq8=(1+\xi)(1-\eta)(1-\zeta)/8 \quad (3),$ where
$X_i, Y_i, Z_i$: dependent nodal point coordinate
$X_{qj}, Y_{qj}, Z_{qj}$: independent nodal point coordinate
$N_{qj}$: three-dimensional one-order shape function of Lagrange.

Figure 25:
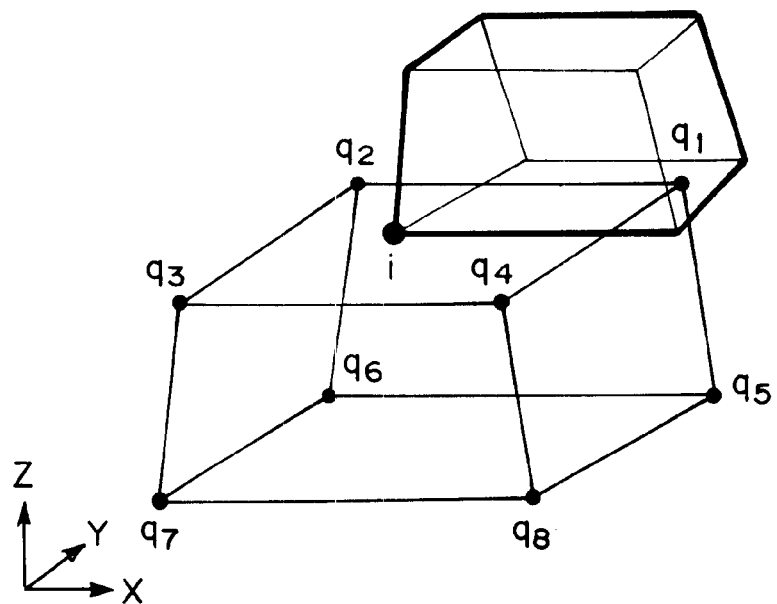
FIG. 25 is a diagram showing a connection status of a nodal point non-coincidence element of a part connection part.
Figure 26:
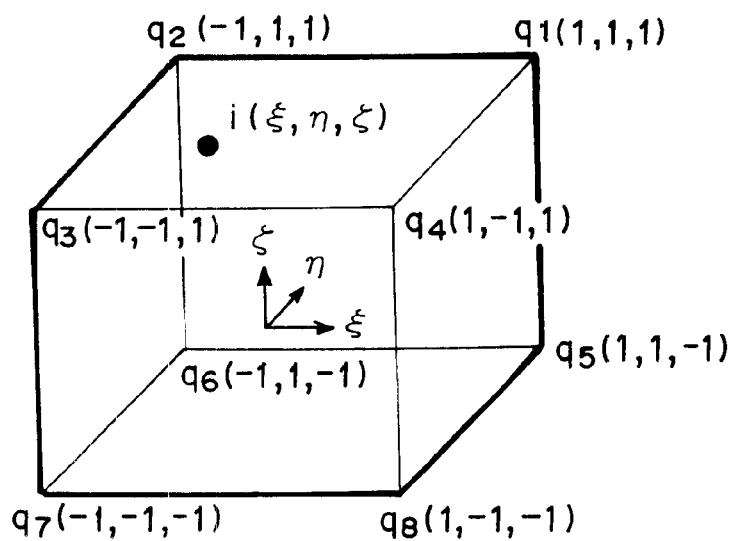
FIG. 26 is a diagram showing $\xi, \eta, \zeta$ normal coordinates.

Such relation ship as shown in FIG. 25 is now assumed as an element connection relationship between neighboring parts as in the case shown in FIG. 3. Here, q1 to q8 represent independent nodal points, and i represents a dependent nodal point. $\xi, \eta, \zeta$ of equation (3) which satisfy the element arrangement shown in FIG. 25 are determined (FIG. 26). $\xi, \eta, \zeta$ thus calculated are substituted for equation (3) to calculate $N_{qj}$ (j=1 to 8). $N_{qj}$ are treated as $\alpha_{qj}$ of equation (2) (j=1 to 8), and set as the constraint condition data representing the element connection. Such constraint condition data are determined for every non-connected nodal points.

Analysis model 401 thus generated is thereafter input to finite element method analyzer 105 and processed therein, and analysis result 501 is output to analysis result storage device 500 or printer 800. In finite element method analyzer 105, the calculation of the nodal point displacement or the nodal point temperature when non-connected nodal points are contained is performed using approximating calculation means 106. Approximating calculation means 106 approximately calculates the non-connected nodal point displacement or the non-connected nodal point temperature from the nodal point displacement or the nodal point temperature of the neighboring structural elements on the basis of the constraint equation.

As described above, according to the present invention, the following effects can be achieved.

According to the data forming method for the finite element method of the present invention, the work of forming the analysis target shape and for the mesh dividing can be performed in a short time. This is because it is sufficient for a user to pile up structural elements irrespective coincidence or non-coincidence of nodal points after inputting a dimensional value for each of some structural elements and performing mesh generation.

According to the calculation method for the finite element method of the present invention, the solution can be obtained even when nodal points are not coincident between elements. This is because when structural data that is analysis target in the finite element method contain non-connected nodal points, the non-connected nodal point displacement or the non-connected nodal point temperature can be approximated from the nodal point displacement or the nodal point temperature of the neighboring structural elements by the constraint equation.

According to the data forming apparatus for the finite element method of the present invention, the analysis model can be formed in a short time. This is because after a user appends actual dimension, physical constants and mesh divisional number for some fundamental shapes to form parts, inputs the relative positions between parts to assemble plural parts on the screen of the display device, and inputs analysis conditions such as the constraint condition, the load condition, and the like, the analysis model containing the constraint equation for connecting nodal points which are non-connected between neighboring parts can be automatically generated.

What is claimed is:

1. An apparatus for generating input data to be analyzed by a finite element method and performing said finite element method, which comprises:

a storage device which stores fundamental shapes;

part data forming means for setting an actual dimension, physical constants and a mesh dividing number for said fundamental shapes in accordance with a user's instruction, thereby forming the part data for the fundamental shapes;

module data forming means for forming the data of a module on the basis of a pair of parts indicated by the user and the relative position between the parts in said pair, said module being constructed by a combination of the paired parts;

analysis condition data forming means for forming analysis condition data according to an analysis condition indicated by the user;

data converting means for inputting model data comprising said part data, said module data and said analysis condition data, and forming an analysis model comprising structural data, converted analysis condition data and constraint condition data, wherein said structural data comprises elements data and date of nodal points which are obtained by building up said parts in accordance with said relative positions and then dividing the shape of said parts by said mesh division number, each component of said converted analysis condition data corresponding to each nodal point, and said constraint condition data being provided for constraint equations for non-connected nodal points which are displaced by different amounts, each of said constraint equations relating said non-connected nodal point between said parts; and finite element method performing means for inputting said analysis model, and performing a calculation of displacements or temperatures of nodal points, wherein a displacement or temperature of each non-connected nodal point is calculated from said constraint equation which inputs displacements or temperatures of nodal points of adjacent finite elements.

2. The apparatus as set forth in claim 1, which further comprises means for generating said constraint equations by using an isoparametric shape function.

3. A computer program product comprising a computer useable medium having computer program code stored therein, said computer program code, when executed, causes a computer to perform the following:

setting an actual dimension, physical constants and a mesh dividing number for said fundamental shapes stored in a storage device in accordance with a user's instruction, thereby forming the part data for the fundamental shapes;

forming the data of a module on the basis of a pair of parts indicated by the user and the relative position between the parts in said pair, said module being constructed by a combination of the paired parts;

forming analysis condition data according to an analysis condition indicated by the user; inputting model data comprising said part data, said module data and said analysis condition data, and forming an analysis model comprising structural data, converted analysis condition data and constraint condition data, wherein said structural data comprises elements data and data of nodal points which are obtained by building up said parts in accordance with said relative positions and then dividing the shape of said parts by said mesh division number, each component of said converted analysis condition data corresponding to each nodal point, said constraint condition data being provided for constraint equations for non-connected nodal points which are displaced by different amounts, each of said constraint equations relating said non-connected nodal point between said parts; and inputting said analysis model, and performing a calculation of displacements or temperatures of nodal points, wherein a displacement or temperature of each non-connected nodal point is calculated from said constraint equation which inputs displacements or temperatures of nodal points of adjacent finite elements.

* * * * *